Patented Nov. 10, 1953

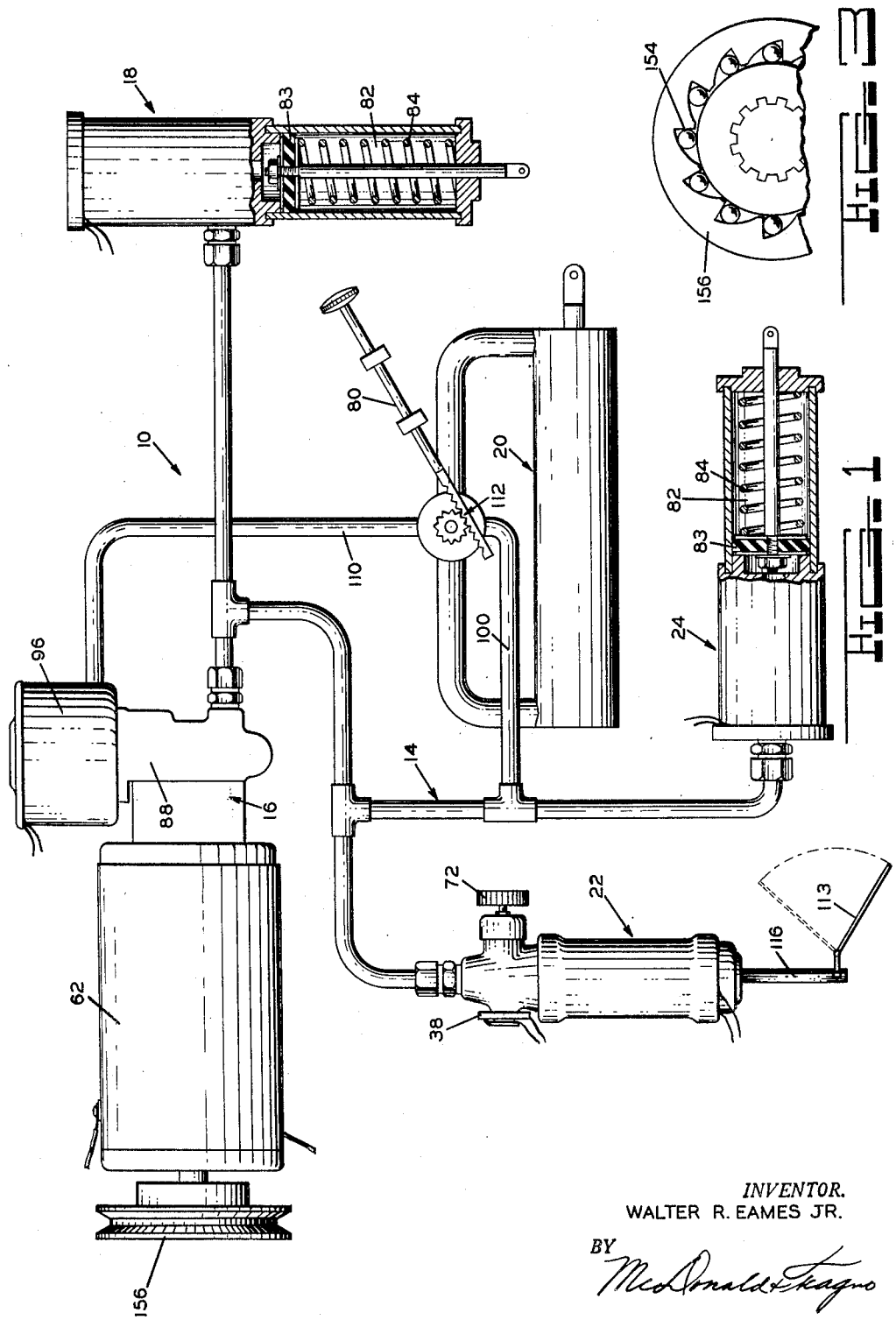

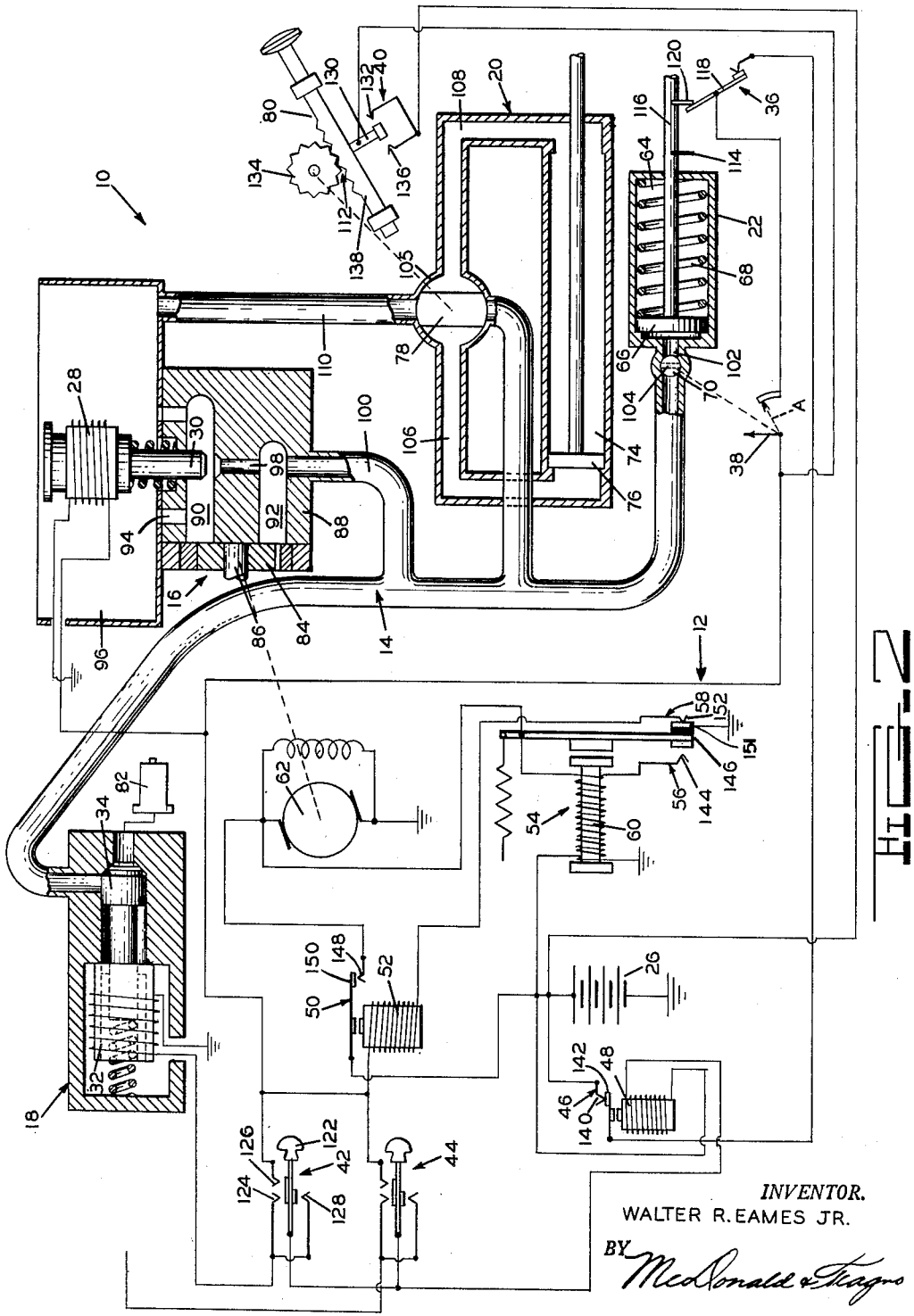

2,658,341

UNITED STATES PATENT OFFICE 2,658,341

HYDRAULIC POWER SYSTEM

Walter R. Eames, Jr., Hazel Park, Mich., assignor to Eaton Manufacturing Company, Cleveland, Ohio, a corporation of Ohio Application May 16, 1950, Serial No. 162,351

5 Claims. (Cl. 60—52)

This invention relates to an electrically controlled hydraulic system and more particularly the application of such a system for the controlled operation of accessories for automotive vehicles.

Broadly the invention comprehends the provision of a hydraulic system for the operation of automotive vehicle windshield wiper actuators, window regulators, and other similar vehicle accessories wherein the hydraulic fluid under pressure as supplied by a hydraulic pump is controlled by electrical means under the manual control of the occupants of the vehicle for the proper desired manipulation of the accessories to be operated by the system. The hydraulic pump is desirably driven from a motorizing generator arranged as an operating unit of the vehicle engine.

The invention has among its several objects the provision of an electrically controlled hydraulic power supply system for the operational control of windshield wiper actuators, window regulators, convertible top lifters and other accessories for automotive vehicles that are effective in operation; that employs a motorizing generator permitting of the operation of the window regulators or other accessories requiring operation when the engine is stopped or is not operating at sufficient speed; that includes means in the electrical control circuit thereof permitting of the operation of the window regulators simultaneously with the windshield wiper operation; and that requires the mere manual operation of switches and valves arranged in the respective electrical hydraulic circuits of the system by the vehicle occupants for the desired operation of any of the accessories powered by the hydraulic system.

Other objects and advantages of the invention will appear from the following description taken in connection with the drawings, forming a part of the specification; and in which, Fig. 1 is a plan view of an electrically controlled hydraulic power supply system for automotive vehicle accessory operation;

Fig. 2 is a schematic diagram of the electrical and hydraulic circuits of the hydraulic system of Fig. 1; and Fig. 3 is a fragmentary enlarged view of the vehicle engine-generator coupling relation.

Similar reference characters indicate corresponding parts throughout the several views of the drawings.

This electrically controlled hydraulic power supply system was devised primarily for automotive vehicle use for the effective operation and simple control of several of the conventional accessories thereof requiring desirable movement to accomplish a desired result such as windshield wiper actuators, window regulators for the raising and lowering of the windows of the vehicle, seat regulators for the fore and aft movement of the vehicle seats, convertible top lifters for raising and lowering the convertible tops of vehicles having same and any of several other accessories requiring a specific given movement. The various accessories are to each derive hydraulic power for the operation thereof from one source, a hydraulic pump having efficient operating characteristics driven from the output of the generator of the vehicle to which the system is applied. Each of the accessories embodies for the power operation thereof a pressure cylinder to which hydraulic pressure fluid is supplied for the operational movement of the pressure piston associated with the cylinder and the supply pressure fluid for the respective cylinders is controlled by the manual operation by an occupant of the vehicle to engage a switch in the electrical circuit controlling the discharge of hydraulic fluid from the pump. Simultaneously the control of the discharge of pressure fluid from the pump as affected by engagement of the electrical switch in the electrical circuit, appropriate fluid flow control valves associated with the respective accessories to be operated by the circuit, are operated to admit, dependent on which accessory it is desired be operated, fluid flow from the pump discharge to the operating cylinder for that particular accessory.

In the structural design incorporated in this system the valves in the case of the windshield wiper actuator, and convertible top lift mechanism are actuated manually together with the electrical switches for said accessories whereas the valve in the window regulator is solenoid operated from the electrical circuit for the system.

Whereas the system is established to permit of the independent operation of each accessory as supplied from the single pump, electrical control means have been employed in the electrical circuit permitting of the simultaneous operation of the windshield wiper actuator and window regulator, wherein actually the circuit for the windshield wiper actuator is interrupted momentarily and the windshield operation stopped temporarily until the raising or lowering operation of the window is completed.

To permit of the raising or lowering of the windows when the engine of the vehicle is either running too slow or is stopped, the generator used is of the motorizing type permitting of the operation thereof, from the engine battery by automatic electrical control connection in the electrical circuit, at a sufficient speed to operate the pump for the ample discharge of fluid therefrom for supply to the operating cylinder of the window regulator.

Referring to the drawings for more specific details of the invention, 10 represents generally an electrically controlled hydraulic power system, adapted to an automotive vehicle for operatively controlling the actuation of several accessories therefor, including basically an electrical circuit 12 and a hydraulic circuit 14.

The hydraulic circuit 14 which constitutes the power operating medium of the system comprises a hydraulic pump 16, as the source of pressure fluid, a group of vehicle accessories, including a window regulator 18, a convertible top lift mechanism 20, a windshield wiper actuator 22 and an actuator 24 for seat adjustment or for the actuation of any other vehicle accessory deriving their source of power from the hydraulic pump.

The electrical circuit 12 which incorporates the control mechanism for the various hydraulic power supplied and actuated accessories comprises a storage battery 26 source of electrical current, a solenoid 28 for controlling the actuation of a valve 30 which, in turn, controls the discharge of fluid from the pump for delivery under pressure to the various accessories, a solenoid 32 for controlling the actuation of a valve 34 controlling the fluid flow to and from the window regulator, an automatic trip switch 36 for the windshield wiper actuator to provide for oscillation movement thereof, manually actuated switches 38, 40, 42 and 44 for the various accessories, a make and break switch 46 controlled by solenoid 48, a make and break switch 50 controlled by solenoid 52, a reverse current relay 54 including make and break switches 56 and 58 respectively controlled by solenoid 60 and a motorizing generator 62, the interconnected function and relationship of which will hereinafter appear.

Windshield wiper actuator 22 comprises a fluid pressure cylinder 64 having a piston 66 reciprocable therein in one direction under the influence of the fluid under pressure delivered thereto from the pump and in its opposite direction by a spring 68 arranged in the cylinder, and a manually actuated valve 70, fixedly secured with the switch 38 for concomitant movement therewith in the manual controlling of the actuator, under the operative control of a manually actuated knob or the like 72, said valve controlling the metered flow of fluid under pressure to the cylinder for the operation of the piston therein.

The convertible top lift mechanism which likewise as the wiper actuator derives its source of power from pump 16 comprises a fluid pressure cylinder 74, a piston 76 reciprocable therein in both directions under the influence of fluid under pressure operative upon the opposite sides of the head of the piston dependent on the direction of movement desired therefor and a three-way valve 78 operative concomitantly with switch 40 through interconnection therewith under the influence of a manual controller 80, said valve 78 controlling flow to the respective opposite sides of the piston for the desired directional movement thereof.

Window regulator 18 and seat adjustment actuator 24 are in all respects alike as the operational movement of the respective accessories is similar, said regulator 18 and actuator 24 each comprising a fluid pressure cylinder 82 having a piston reciprocable therein in one direction under the influence of fluid under pressure and in the opposite direction by a spring 84, with the fluid flow thereto under the control of solenoid actuated valve 34 adapted to be spring seated in one direction to cut off communication between the pump 16 and cylinder 82. Any number of similar cylinders and control arrangements as this can be provided depending on the number of windows or other similar accessories adapted to be regulated in a like manner.

The pump 16 as illustrated is preferably of the internal gear type affording high efficiency operation and is driven from the generator by coupling relation between the inner rotor 84 of the pump and the output shaft 86 of the generator, said pump being disposed in pump housing 88 having suitable intercommunicated intake and discharge ports 90 and 92 respectively controlled as by the solenoid actuated valve 30, normally spring pressed to open position as shown by Fig. 2 of the drawings. The intake port 90 of the pump is suitably connected by passages 94 in the housing to a fluid supply tank or reservoir 96. The discharge port 92 is connected by a passage 98 for communication therebetween and by suitable branch conduits 100 connected to the housing for the delivery of fluid from the pump discharge to the respective fluid operated accessories.

The valve 70 for the windshield wiper actuator is positioned in the inlet 102 to the cylinder 64 and is provided with a predetermined sized orifice 104 therein such that in one range of positions of operation the valve will provide for the desired flow of fluid to the cylinder and in another range of position the valve will close off the cylinder from communication with the pump by way of the conduits.

The three-way valve 78 is positioned in a valve housing 105 which has communication by way of passages 106 and 108 respectively with the opposite ends of the cylinder and by way of conduits 100 and 110 respectively with the pump and reservoir is adapted by way of pinion and rack gear connection 112 with controller 80 to be moved to (1) block off connection of any one communication to any other communication (2) provide communication between the reservoir communication and passage 106 while simultaneously providing communication between the pump communication and the passage 108, or (3) provide communication between the reservoir communication and passage 108 while simultaneously providing communication between the pump communication and passage 106.

Switch 38 for the operational control of windshield wiper actuator is arranged in the electrical circuit for solely make and break relation with the circuit for the energization of the solenoid 28 controlling the discharge from the pump in its actuation of valve 30 thereof, and as such sets the actuator in operation, whereas the switch 36 is of the make and break type engageable for the proper controlled operation of the electrical circuit to solenoid 28 by means associated with the piston for the oscillating control of the piston.

Switch 40 is engageable to close the electrical circuit for the energization of the coil of solenoid 28 at opposite ends of its normal push-pull movement of controller 80, operative simultaneously to shift the valve 78 geared thereto.

The switches 42 and 44 are operative to engagement with the electrical circuit to either up or down position in viewing Fig. 2 of the drawings for the desired directional movement of the accessory associated therewith, the purpose of which will hereinafter appear.

The reverse current relay 54 which includes make and break switches 56 and 58 controlled as by a solenoid 60 is employed for the purpose of providing for the operation of the generator by the motorizing thereof from the storage battery if the speed of the engine is below a sufficient amount for the generator charging of the battery or when the engine is stalled, so that the generator can be operated to drive the pump as may be required for operation of the window regulators.

With the various elements of the system in the position shown by Fig. 2 wherein the switches are in their unattended or deenergized condition, and with the generator being driven from the engine at an ample speed for the driving of the pump 16 by way of the coupling relation thereof with the output end of the generator shaft, the pump operates to recirculate oil at no pressure between its discharge and intake ports because of the open communication provided therebetween inasmuch as the valve 30 is spring pressed off of its shut off control seat between the intake and discharge ports of the pump wherein no demand for fluid under pressure for the operation of any of the component accessories of the system has been made.

Upon desire of operation of the windshield wiper actuator for the operation of a suitable windshield wiper element 113 suitably connected to the movable piston 66 thereof, by the manipulation of knob 72 to move the switch 38 to closed circuit position as shown by dotted line A and valve 70 to open metering condition for permissible flow of fluid between cylinder 64 and the pump housing 88 by way of branch conduit 100 connected therebetween, the electrical and hydraulic circuits of the system as they effect the windshield wiper actuator are placed in operation. The closing of switch 38 operates to close the electrical circuit and provide for a flow of current from battery 26 through the solenoid operated switch 46, through trip action switch 36, thence through switch 38 which is now manually closed to the coil of solenoid 28 for the actuation thereof effective to move the valve 30 to its seat and thus shut off communication between the intake and discharge ports of the pump. With the closing of communication between the pump ports fluid is discharged from the pump, through conduit 100 and through the orifice 104 in valve 70 into the cylinder effective to force the piston in the cylinder against the resistance of spring 68 thus causing the movement of the windshield wiper element 113 connected to the piston. As the piston is moved to the right as viewed in Fig. 2, a lug or finger 114 affixed to the output shaft 116 of the piston engages the switch lever 118 of switch 36 to open the switch and thus open the circuit between solenoid 28 and the battery. Upon the interruption of current flow to the coil of solenoid 28 the valve 30 moves under the influence of its spring to again provide communication between the intake and discharge ports of the pump and thus permit recirculation therebetween. Simultaneously with the recirculation of the pump the spring 68 forces the piston 64 toward the left (Fig. 2) operative to force fluid from the cylinder through valve 70, connecting conduit 100 and passage 98 for return to the pump and reservoir. This operation continues until the piston reaches its extreme left hand position (Fig. 2) at which time a finger or lug 120 affixed to the piston similarly to lug 114 engages switch lever 118 to again provide contact closing of switch 36 effective to reenergize the coil of solenoid 28 through closed switch 38 to the battery. Once again as valve 30 is seated, the fluid is discharged from the pump to cylinder 64 for the alternate reverse movement of the actuator 22. This cycle of operation will continue so long as the switch 38 remains in closed position A.

If it is desired to raise or lower a window appropriately connected to the output of piston 83 incorporated in the window regulator 18, the push button switch 42 is moved to the position corresponding to the direction in which it is desired the window be moved such for example, upon the movement of switch lever 122 to a position engaging contact points 124 and 126 respectively thereof current will flow from the battery, through the coil of solenoid 48, thence through the switch lever and contact points 124 and 126 of the switch 42 and from contact point 124 to the coil of solenoid 32. Current from the battery simultaneously flows from the battery by way of contact point 126 to the coil of solenoid 28 for the actuation thereof effective to move the valve 30 to its seat closing off communication between the intake and discharge ports of the pump, resulting in the discharge of fluid under pressure from the pump through the conduit 100 to the cylinder 82 past valve 34 which in the meantime has been moved off its seat under the energized influence of coil 32 to allow the free flow to window regulator cylinder 82. With the continued engagement of the switch 42 through contact points 124 and 126 the fluid delivered to cylinder 82 operates to move the piston and suitable window connections therewith in the desired directional movement of the window selected, which for the sake of clarity we can here define as being raised to correspond to the upward movement of switch lever 122 as viewed in Fig. 2. When it is determined that the window has been moved to its desired height it is then only necessary for the person manipulating switch 42 to return it to its neutral position as shown in Fig. 2 at which time the electrical circuits are opened by way of contacts 124 and 126 the solenoids associated therewith are deenergized permitting of their spring return to normal inactive position, with valve 30 again opening communication between the intake and discharge ports of the pump and valve 34 seating itself to trap the fluid in the window regulator cylinder 82 to thus hold the window in adjusted raised position. With the communication of the intake and discharge ports the pump again recirculates fluid therethrough at no pressure.

In the case of desiring to lower the window associated with window regulator 18 the switch lever 122 is manually depressed thereby causing an engagement thereof with contact 128 so as to effect a flow of current from battery 26, through the coil of solenoid 48, and switch 42 to the coil of solenoid 32 for the energization thereof operative to move valve 34 off its seat to provide for the spring pressed movement of piston 83 to lower the window and simultaneously force the fluid out of cylinder 82, past valve 34 through conduit 100 and return to the pump housing. When the window has been lowered to the desired position, the switch lever 122 is again returned to neutral opening the circuit therethrough effective to cause the spring movement of valve 34 to closed position with the ensuing entrapment of fluid in the cylinder 82 to thus hold the window at the adjusted height.

Switch 44 and the hydraulic circuit controlled thereby operates identically with switch 42 and is illustrated primarily to show that any number of such switches and valves to be controlled thereby could be employed for the raising and lowering of other windows, turning front door ventilators, controlling the operation of a seat adjuster and of several other accessories which it may be desired to control.

The lifting or lowering of a convertible top which is actuated under the control of the top lift mechanism 20 can be accomplished, in the case of lifting the top by the pull manipulation of controller 80 operative to provide electrical current conducting engagement between point contact 130 of switch 40 with a contactor arm 132 affixed to the controller 80, thus providing for the flow of current from the battery through contact points 130 and 132 to the coil of solenoid 28 for the operation thereof. Simultaneously with the engagement of points 130 and 132 by the movement of controller 80 the pinion gear 134 is rotated counter-clockwise causing valve 78 to be moved likewise through about 45°. With the movement of valve 78, 45° from its normal vertical position shown by Fig. 2 in a counter-clockwise direction communication is provided between the pump communication of conduit 100 and left-hand end of cylinder 74 by way of passage 106 permitting of the flow of fluid under pressure to move the piston 76 to the right and actuate the top lifting device attached to the piston shaft. As the piston is moved to the right (Fig. 2) the fluid to the right thereof is discharged therefrom through passage 108 past valve 78, providing communication between passage 108 and conduit 110, into conduit 110 for delivery thereby to the pump reservoir 96. Once the lift mechanism has moved the convertible top to its desired raised position the controller 80 is moved to its vertical position such as shown by Fig. 2 of the drawings, thus trapping the fluid in the cylinder to maintain the piston 76 stationary at the selected position of movement thereof and likewise disconnecting the electrical circuit effective to deenergize solenoid 28 and cause the idle no-pressure cycle of the pump.

To lower the top the controller 80 is pushed to a position providing electrical current contact engagement between controller arm 130 and contact point 136 of the electrical circuit for the flow of current therethrough to solenoid 28, from battery 26, through points 130 and 136 for the energization thereof and the subsequent controlled discharge operation of pump 16 by way of conduit 100. With the push movement of controller 80 the rack gear 138 engages pinion gear 134 for the clockwise rotation thereof and valve 78 attached thereto about 45° resulting in providing communication past the valve between conduit 100 and passage 108 for the delivery of pressure fluid to cylinder 74 and the exhausting of fluid from the opposite end of the cylinder by way of communication between conduit 110 and passage 106. This controlled communication of the cylinder 74 with the pump discharge and reservoir permits of the movement of piston 76 to the lift to effect a lowering of the top through the attachment thereof with the piston 76. After the top has been lowered, the controller 80 is moved to neutral to once again immobilize the electrical and hydraulic circuits controlled thereby.

Under conditions wherein it is desired to operate the windows of the vehicle when the windshield wiper is in operation, and especially to prevent oscillation of the window, make and break switch 46 controlled by solenoid 48 operates automatically to open the circuit of the windshield wiper actuator between the switches 36 and 38 thereof and the battery source of current, the points 140 and 142 of switch 46 being normally spring pressed to closed position as shown by Fig. 2 when solenoid 48 is deenergized. The movement of either of the electrical current flow control switches 42 and 44 in the desired movement of the accessories controlled thereby immediately operates to provide for the flow of current through the coil of solenoid 48 resulting in the energization thereof and the breaking of electrical current conducting relation between contact points 140 and 142 of switch 46 and the consequent opening of the circuit for the windshield wiper actuator if the circuit is otherwise made through switches 36 and 38. The disconnection of the wiper electrical control circuit operates to interrupt the wiper operation momentarily during the period of window regulation but it is felt it will be hardly noticeable and will not appreciably impair the wiper operation.

For the purpose of permitting of the energizing operation of the window regulators or other similar accessory actuators should the engine not be running or if its speed is not sufficient to provide for current conducting relation between contact point 144 of switch 56 and contactor arm 146 common to both switches 56 and 58 of the reverse current relay 54 controlled as by solenoid 60, the closing of either switch 42 or 44 will cause the generator to be connected to the storage battery through contact points 148 and 150 of solenoid 52 controlled switch 50, as a result of the energization of solenoid 52 serving to effect an engagement of said points 148 and 150. The reverse current relay 54 is of the common variety of reverse current relays called cut-outs which are employed in all present day automobiles, and wherein the cut-out serves to disconnect the generator from the battery when the generator voltage is not sufficient to charge battery 26 and prevents the generator from acting as a motor, but through the provision of contact relation of the contactor arm 146 to contact point 152 of switch 58 to a standard cut-out relay, the generator can be motorized through contact points 148 and 150 of switch 50, when the engine is not running or running at an insufficient speed.

If it is desired to raise the windows of a vehicle controllably operated by window regulators 18, if the engine is not running or with the engine running at a speed too low to deliver sufficient voltage to cause engagement between contactor arm 146 and contact point 144 of the reverse current relay 54 by way of energization of solenoid 60, the contactor arm will remain in current conducting relation with contact point 152 of switch 58, as shown on Fig. 2 of the drawings. Movement of either of the push button switches 42 or 44 with the switch 58 of the reverse current relay closed, current will flow from the battery 26 through the coil of solenoid 48, through switch lever 122 to contact points 124 and 126 engageable therewith and thence from point 126 to the coil of solenoid 28 for the energization thereof and the operation discharge control of pump 16. The current also flows from contact point 126 through the coil of solenoid 52, effecting engagement of points 148 and 150 of switch 50 and thence from the coil of solenoid 52 through the contacts of switch 58 to ground. With the engagement of points 148 and 150 of switch 50 current flows from battery 26 by way of switch 50 to the generator for the motorizing thereof, with the provision that the conductor for conveying high current and delivering sufficient power to the generator for its motorization is a heavy cable. The motorizing of the generator provides for the operation of the pump 16 at a sufficient speed to deliver fluid as it would if it were driven directly from the engine of the vehicle.

Concomitantly with the motorizing of the generator, operation of the pump, and control of the discharge therefrom the operational movement of switch lever 122 to engage contact 124 provides for the operational control of the window regulator as pressure fluid is supplied to the operating cylinder thereof for the raising of the window actuated thereby.

The generator 62 herein employed should preferably be of the type capable of delivering a high starting torque so that it can be used as a motor and furthermore provision is made so that it can be uncoupled by means of a one-way over-running clutch 154 from driving relation with the vehicle engine by way of pulley 156 and belt arrangement, not shown, when it is being used as a motor. It is not intended that the windshield wiper should be used or that any attempt should be made to raise or lower the convertible top when the engine is not running although provision is made for window operation at that time.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. An electrically controlled hydraulic power system comprising a hydraulic pump, a solenoid operated valve for controlling the discharge from the pump, first and second hydraulic cylinders, conduits providing communication between the pump and cylinders, a reciprocal piston in each of the cylinders, spring means in the second cylinder for biasing the piston therein in an opposite direction to the fluid pressure delivered thereto, means providing communication of the opposite ends of the first cylinder, with the discharge of the pump, an hydraulic fluid supply means for the pump, said communication of the opposite ends of the first cylinder also having communication with the fluid supply means, a solenoid operated valve for controlling the fluid flowing to and from the second cylinder, a three-way manually operated valve for controlling the communication of the first cylinder at the opposite ends respectively with the fluid supply means for the pump and the pump discharge and for shutting off communication completely of both ends of the cylinder, two electrical circuits connecting a single source of electrical current to the solenoid operated valve for the pump, a switch, in the first circuit, operable to control the solenoid operated valve for the pump for the desired delivery of pressure fluid in the second cylinder, a manually operated push pull control for actuating the three-way valve, an electrical switch actuated by the push pull control connected in the second electrical circuit for controlling the energization of the solenoid operated valve for the pump, and an electrical switch for the solenoid operated valve controlled cylinders, in its own circuit for controlling the energization of the solenoid operated valve for the pump and the solenoid operated valve for the cylinder in circuit therewith.

2. An electrically controlled hydraulic power system comprising a hydraulic pump, a solenoid operated valve for controlling the discharge from the pump, first, second and third hydraulic cylinders communicating with the discharge from the pump, a motion transmitting piston reciprocal in each of the cylinders, a hydraulic fluid reservoir for the pump, means for providing communication of both ends of the first cylinder with the pump discharge, means for providing communication of both ends of the first cylinder with the reservoir, a manually actuated valve for controlling the flow of hydraulic fluid to and from the second cylinder, spring means biasing the piston in the second cylinder against the pressure fluid delivered thereto by the pump, a three-way valve for controlling the communication of the ends of the first mentioned cylinder respectively with the reservoir and pump discharge, a solenoid operated valve for controlling the flow of fluid to and from the third cylinder, spring means for biasing the piston in the third cylinder against the pressure delivered thereto by the pump, a source of electrical current, first, second and third parallel electrical circuits connected between the source of current and the solenoid operated valve for the pump, an electrical switch connected with the manually actuated valve for simultaneous movement therewith arranged in the first electrical circuit, a second electrical switch actuated by movement of the piston in the second cylinder arranged in the first circuit, a third electrical switch connected to the three-way valve for simultaneous movement therewith arranged in the second electrical circuit, said solenoid operated valve for the third cylinder being electrically connected with the source of current, and a manually actuated switch in the third electrical circuit between the solenoid operated valve for the pump and the source of current and in the current supply circuit to the solenoid operated valve of the third cylinder.

3. An electrically controlled hydraulic power system comprising a hydraulic pump, a solenoid operated valve for controlling the discharge from the pump, first, second and third hydraulic cylinders, a motion transmitting piston reciprocal in each of the cylinders, a hydraulic fluid reservoir for the pump, means for providing communication of both ends of the first cylinder with the reservoir, a manually actuated valve for controlling the flow of hydraulic fluid to and from the second cylinder, spring means biasing the piston in the second cylinder against the pressure fluid delivered thereto by the pump, a three-way valve for controlling the communication of the ends of the first cylinder respectively with the reservoir and pump discharge, a solenoid operated valve for controlling the flow of fluid to and from the third cylinder, spring means for biasing the piston and the third cylinder against the pressure delivered thereto by the pump, a source of electrical current, first, second and third parallel electrical circuits connected between the source of current and the solenoid operated valve for the pump, an electrical switch, connected with the manually actuated valve for simultaneous movement therewith, arranged in the first electrical circuit, a second electrical switch, actuated by movement of the piston in the second cylinder, arranged in the first circuit, a third electrical switch, connected to the three-way valve for simultaneous movement therewith, arranged in the second electrical circuit, said solenoid operated valve for the third cylinder being electrically connected with the source of current, a manually actuated switch in the third electrical circuit between the solenoid operated valve for the pump and the source of current and in the current supply circuit to the solenoid operated valve of the third cylinder and a solenoid operated switch in the first circuit having the first and second switches therein, controlled for energization by the third electrical circuit.

4. An electrically controlled hydraulic power system comprising a hydraulic pump, a solenoid operated valve for controlling the discharge from the pump, first and second hydraulic cylinders, a motion transmitting piston reciprocal in each of the cylinders, a hydraulic fluid reservoir for the pump, means for providing communication of both ends of the first cylinder with the pump discharge, means for providing communication of both ends of the first cylinder with the reservoir, a manually actuated valve for controlling the flow of hydraulic fluid to and from the second cylinder, spring means biasing the piston in the second cylinder against the pressure fluid delivered thereto by the pump, a three-way valve for controlling the communication of the ends of the first cylinder respectively with the reservoir and pump discharge, a solenoid operated valve for controlling the flow of fluid to and from the third cylinder, spring means for biasing the piston in the third cylinder against the pressure delivered thereto by the pump, a source of electrical current, first, second and third parallel electrical circuits connected between the source of current and the solenoid operated valve for the pump, a first electrical switch, connected with the manually actuated valve for simultaneous movement therewith, arranged in the first electrical circuit, a second electrical switch actuated by movement of the piston in the second cylinder, arranged in the first circuit and a third electrical switch, connected with the three-way valve for simultaneous movement therewith arranged in the second electrical circuit, said solenoid operated valve for the third cylinder being electrically connected with the source of current, a manually actuated switch in the third electrical circuit between the solenoid operated valve for the pump and the source of current and in the current supply circuit to the solenoid operated valve of the third cylinder, a solenoid operated switch in the first circuit having first and second switches therein, controlled for energization by the third circuit, a motorizing generator having its output shaft connected to the pump, a pair of parallel electrical circuits connecting the generator to the source of current, a reverse current relay connected in the second circuit, and a solenoid operated switch in the third circuit controlled by the operation of the manually actuated switch.

5. An electrically controlled hydraulic power system comprising a hydraulic pump, a solenoid operated valve for controlling the discharge from the pump, first, second and third hydraulic cylinders communicating with the discharge from the pump, a motion transmitting piston reciprocal in each of the cylinders, a hydraulic fluid reservoir for the pump, means for providing communication of both ends of the first cylinder with the pump discharge, means for providing communication of both ends of the first cylinder with the reservoir, a manually actuated valve for controlling the flow of hydraulic fluid to and from the second cylinder, spring means biasing the piston in the second cylinder against the pressure fluid delivered thereto by the pump, a three-way valve for controlling the communication of the ends of the first cylinder respectively with the reservoir and pump discharge, a solenoid operated valve for controlling the flow of fluid to and from the third cylinder, a source of electrical current, first, second and third parallel electrical circuits connected between the source of current and the solenoid operated valve for the pump, a first electrical switch connected with the manually actuated valve for simultaneous movement therewith arranged in the first electrical circuit, a second electrical switch actuated by movement of the piston in the second cylinder arranged in the first electrical circuit, a third electrical switch connected to the three-way valve for simultaneous movement therewith arranged in the second electrical circuit, said solenoid operated valve for the third cylinder being electrically connected with the source of current, an automatically operated electrical switch in the first electrical circuit, a solenoid in the circuit of the third switch for controlling the operation of the automatically operated electrical switch, a manually actuated switch arranged in the third electrical circuit, a motorizing generator having its output shaft connected to the pump, an electrical circuit connecting the generator to the source of current, a second electrical circuit connecting the generator to the source of current, an automatically operated electrical switch in the first generator circuit, a reverse current relay in the second generator circuit, said manually actuated switch for the third circuit having an electrical connection with the source of current through the reverse current relay and a solenoid in the electrical connection of the manually actuated switch and reverse current relay for controlling the operation of the switch in the first generator circuit.

WALTER R. EAMES, Jr.

References Cited in the file of this patent

UNITED STATES PATENTS

| Number | Name | Date |
|---|---|---|
| 2,032,185 | Sciaky | Feb. 25, 1936 |
| 2,319,551 | Linden et al. | May 18, 1943 |
| 2,438,389 | Edge | Mar. 23, 1948 |
| 2,499,072 | McClure | Feb. 28, 1950 |
| 2,554,930 | Ulinski | May 29, 1951 |
| 2,567,715 | Keusch et al. | Sept. 11, 1951 |

FOREIGN PATENTS

| Number | Country | Date |
|---|---|---|
| 479,717 | Germany | July 22, 1929 |